(12) United States Patent
Bass et al.

(10) Patent No.: US 9,286,129 B2
(45) Date of Patent: Mar. 15, 2016

(54) TERMINATION OF REQUESTS IN A DISTRIBUTED COPROCESSOR SYSTEM

(71) Applicant: INTERNATIONAL BUSINESS MACHINES CORPORATION, Armonk, NY (US)

(72) Inventors: Brian Mitchell Bass, Apex, NC (US); Bartholomew Blaner, Underhill Center, VT (US); Jay Gerald Heaslip, Williston, VT (US); Robert Dov Herzl, South Burlington, VT (US); Kenneth Anthony Lauricella, Colchester, VT (US); Ross Boyd Leavens, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 13/889,859

(22) Filed: May 8, 2013

(65) Prior Publication Data

US 2014/0337855 A1    Nov. 13, 2014

(51) Int. Cl.
*G06F 9/46*    (2006.01)
*G06F 9/50*    (2006.01)

(52) U.S. Cl.
CPC ...... *G06F 9/5044* (2013.01); *G06F 2209/5013* (2013.01)

(58) Field of Classification Search
None
See application file for complete search history.

(56) References Cited

U.S. PATENT DOCUMENTS

| 7,613,849 | B2 | 11/2009 | Radulescu et al. | |
|---|---|---|---|---|
| 2002/0109688 | A1* | 8/2002 | Olarig | 345/520 |
| 2003/0169626 | A1* | 9/2003 | Burk et al. | 365/200 |
| 2007/0279084 | A1* | 12/2007 | Oh et al. | 326/30 |
| 2008/0244136 | A1* | 10/2008 | Radulescu et al. | 710/260 |
| 2008/0294624 | A1* | 11/2008 | Kanigsberg et al. | 707/5 |
| 2009/0158282 | A1* | 6/2009 | Blaisdell et al. | 718/102 |
| 2009/0316904 | A1 | 12/2009 | Babbar et al. | |
| 2012/0030421 | A1* | 2/2012 | Chang et al. | 711/108 |
| 2014/0007098 | A1* | 1/2014 | Stillwell et al. | 718/1 |

* cited by examiner

*Primary Examiner* — Emerson Puente
*Assistant Examiner* — Steven Do
(74) *Attorney, Agent, or Firm* — L. Jeffrey Kelly; Steven Meyers

(57) ABSTRACT

A system and method of terminating processing requests dispatched to a coprocessor hardware accelerator in a multi-processor computer system based on matching various fields in the request made to the coprocessor to identify the process to be terminated. A kill command is initiated by a write operation to a coprocessor block kill register and has match enable and value for each field in the coprocessor request to be terminated. Enabled fields may have one or more values associated with a single request or multiple requests for the same coprocessor. At least one match enable must be set to initiate a kill request. A process kill active signal prevents other coprocessor jobs from moving between operational stages in the coprocessor hardware accelerator. Processing jobs that are idle or do not match the fields with match enables set signal done with no match and continue processing. Processing jobs that do match the fields with match enables set are terminated and signal done with match. When all processing jobs have signaled done, a done bit is set in the coprocessor block kill register to indicate completion of the kill to the initiating software. The register also holds the match status of each processing job.

13 Claims, 4 Drawing Sheets

TERMINATION OF REQUESTS IN A DISTRIBUTED COPROCESSOR SYSTEM

BACKGROUND

1. Field of the Invention

The embodiments herein relate to management of coprocessor hardware accelerator resources in multi-processor computer systems, and more specifically, to a system and method for terminating a processing job previously dispatched to a coprocessor hardware accelerator.

2. Description of the Related Art

In computer systems employing multiple processor cores, it is advantageous to employ hardware accelerator coprocessors to meet throughput requirements for specific applications. Hardware accelerator coprocessors supplement the functions of a primary CPU by providing a dedicated processing resource for computationally intensive operations, such as floating point operations, encryption and compression/decompression. Coprocessors utilized for hardware acceleration may be collocated with a main CPU, as in the case of a floating point unit or graphics processing unit, or configured in a block of coprocessors and coupled to a bridge that interfaces with a main system bus to provide connectivity to other nodes on the bus.

Tasks are off-loaded by a processor to a coprocessor block attached to a system bus by sending a request to the coprocessor, which may contain commands, source and target addresses, lengths, and other fields. Coprocessor request data is formatted and stored in a request queue and issued to a coprocessor when one is available with the type of hardware accelerator engine required to handle the request submitted.

A coprocessor executing a job fetches operands, performs the function in an attached hardware acceleration engine, stores the results, and indicates completion via status writes and optionally an interrupt. Coprocessors may hold multiple job requests, with each one in various stages of completion. A coprocessor may be configured to simultaneously prefetch operands, execute a processing job or writeback results and status. A coprocessor may also pipeline certain functions using register arrays to accommodate simultaneous processing.

In some situations it is desirable to allow a processor to terminate one or more job requests that have been issued, particularly where there is unacceptable delay in executing the request or the results are no longer needed due to a system interrupt or flushing of an active instruction stream. However, termination of a job request must allow subsequently issued coprocessor requests to proceed, so that unrelated job requests waiting in queue for the resources of a particular coprocessor are not discarded as well.

Accordingly, there exists a need in the art to overcome the deficiencies and limitations described hereinabove.

SUMMARY

In view of the foregoing, disclosed herein are embodiments related to managing hardware accelerator coprocessor resources in a multi-processor computer system through selective termination of previously dispatched processing jobs. . In the embodiments, hardware acceleration engines are coupled to direct memory access (DMA) channels incorporating local memory buffers, which hold data needed to execute processing functions by the hardware acceleration engines associated with a coprocessor function.

In the embodiments, coprocessor job requests are initiated by an instruction issued by an owning process. The job request may be initiated in software through a hypervisor or other virtual machine management arrangement or by an individual processor or bus agent. The coprocessor request is formatted to include data fields for identifying a specific request and the bus agent requesting hardware acceleration. The job request is forwarded to a bridge controller designed to manage data and address flow between the coprocessor complex and the main system bus.

In the embodiments, the bridge controller maintains multiple request queues and the DMA controller moves the coprocessor requests to the coprocessor complex and assigns them to DMA channels having the required type of coprocessor hardware acceleration engine.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

The embodiments herein and the various features and advantageous details thereof are explained more fully with reference to the non-limiting embodiments that are illustrated in the accompanying drawings and detailed in the following description.

Figure 1:
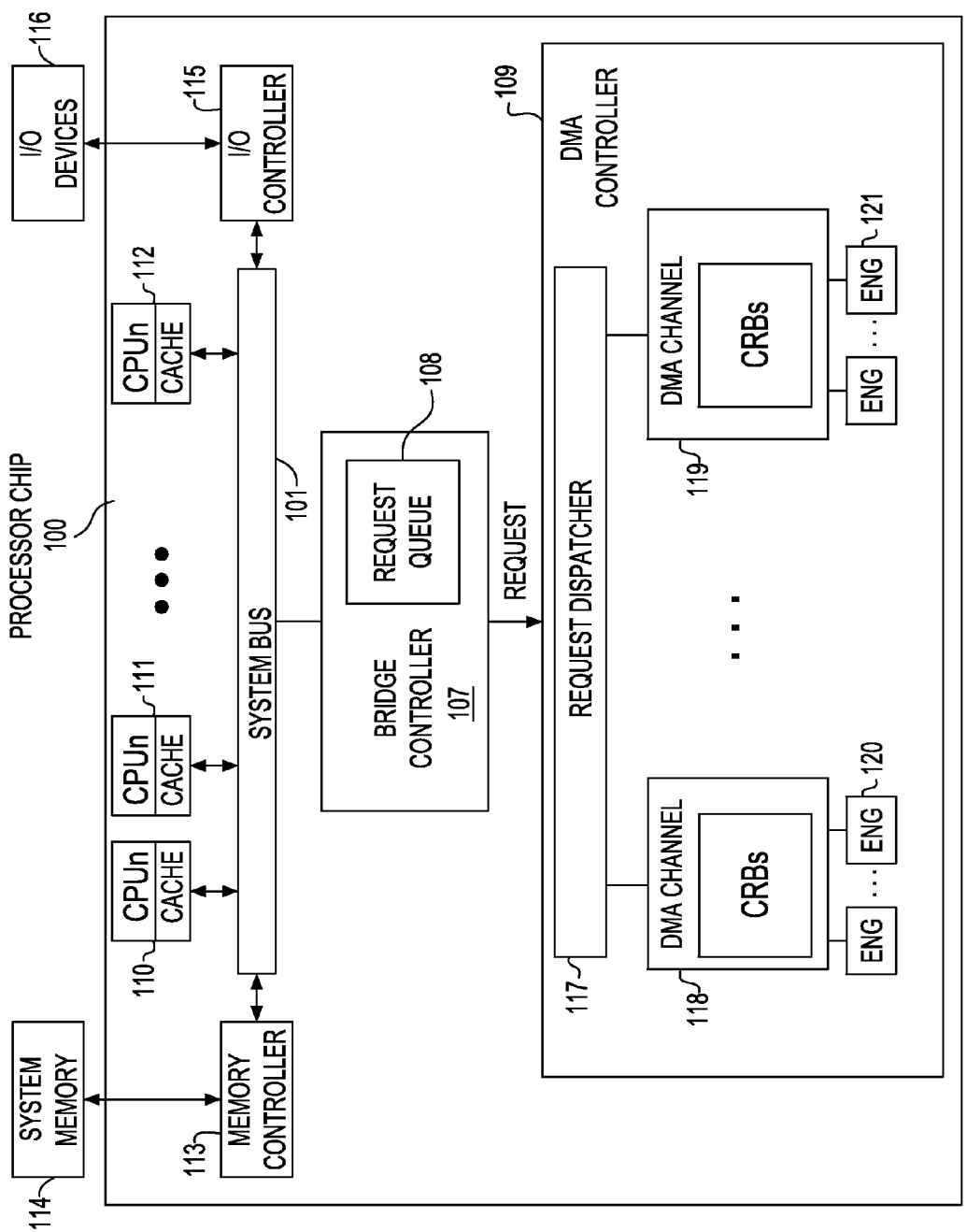
FIG. 1 is a schematic block diagram illustrating a distributed multi-processor computer system having shared memory resources connecting through a bridge agent coupled to a main bus and employing hardware acceleration engine coprocessors.

An example of a computer architecture employing dedicated coprocessor resources for hardware acceleration is the IBM Power Server system. However, a person of skill in the art will appreciate embodiments described herein are generally applicable to bus-based multi-processor systems with shared memory resources incorporating hardware accelerator coprocessors. A simplified block diagram of hardware acceleration dataflow in a multi-processor system is shown in FIG. 1. Processor chip 100 has multiple CPU cores (0-n) and associated cache 110, 111, 112 which connect to system bus 101. Memory controller 113 provides the link between system bus 101 and external system memory 114. I/O controller 115 provides the interface between system bus 101 and external I/O devices 116. System bus 101 is the bus fabric that facilitates data, address, and control movement between the various interconnected components.

Coprocessor complex 109 is connected to system bus 101 through a bridge controller Interface 107. ("coprocessor" as used herein, is synonymous with "coprocessor hardware accelerator," "hardware accelerator," "hardware acceleration engine" and like terms.) Bridge controller 107 maintains a queue of coprocessor requests received from CPU cores 110, 111, 112 to be issued to the coprocessor complex 109. Bridge controller 107 includes n shared read buffers 108 to temporarily store read data requests and data retrieved from memory or cache associated with a hardware accelerator job performed by a coprocessor. It also contains queues of read and write commands and data issued by coprocessor complex 109 and converts these to the appropriate bus protocol used by system bus 101. Coprocessor complex 109 contains multiple DMA channels through which coprocessor requests and results are transmitted. DMA channels 0:L−1 (118, 119) send requests through the Request Dispatcher 117 for read data needed for jobs executed by the hardware accelerators 120, 121. DMA channels 118, 119 each include m local read buffers shared between the hardware accelerators 120, 121 connected to DMA channels 0 to L−1 (118, 119). Request dispatcher 117 arbitrates requests manages the transfer, pendency and priority of read data requests. Each channel includes a DMA engine and one or more attached hardware accelerator engines 120, 121 that perform selected co-processor functions. An exemplary queueing structure for a distributed computer system utilizing coprocessor resources for hardware acceleration is shown in commonly assigned U.S. patent application Ser. No. 13/323914 filed Dec. 13, 2011 and is hereby incorporated by reference.

Coprocessor acceleration engines 120 and 121 may perform cryptographic functions and memory compression/decompression or any other dedicated hardware function. DMA channels 118 and 119 read and write data and status on behalf of coprocessor hardware accelerator engines 120 and 121. Bridge controller 107 buffers data routed between the coprocessor hardware acceleration engines 120 and 121 and system bus 101 and enables bus transactions necessary to support coprocessor data movement, interrupts, and memory management I/O associated with hardware acceleration processing. Persons skilled in the art will appreciate various combinations of hardware accelerators may be configured in parallel or pipelined without deviating from the scope of the embodiments herein.

In order for the accelerators to perform work for the system, the coprocessor complex 109 must be given work from a hypervisor or virtual machine manager (VMM) (not shown), implemented in software to manage the execution of jobs running on the coprocessor complex 109. A request for coprocessor hardware acceleration is initiated when a coprocessor request command is received by the bridge controller 107. Requests for coprocessor resources from system bus 101 are received by a request queue and entered in a shared request buffer 108. Coprocessor requests have an associated block of control data called the Coprocessor Request Block (CRB). If a request and CRB is successfully enqueued, when a coprocessor hardware accelerator engine is available, the job will be dispatched to the DMA controller 109. In other words, bridge controller 107 signals DMA controller 109 there is work to perform and DMA controller 109 will remove the job from the head of the job request queue and begin processing the request.

DMA controller 109 then assigns the coprocessor request to an appropriate DMA channel 118, 119 connected to the type of coprocessor hardware accelerator engine requested. DMA controller 109 commands the coprocessor hardware accelerator engine to start and also begins fetching the data associated with the job request.

When coprocessor hardware accelerator engines 120, 121 have output data or status to be written back to memory, they make an output request to DMA controller 109, which moves the data from the coprocessor to local buffer storage and from there to bridge controller 107 and then to memory. Upon completion, the coprocessor is ready to accept another job request.

Figure 2:
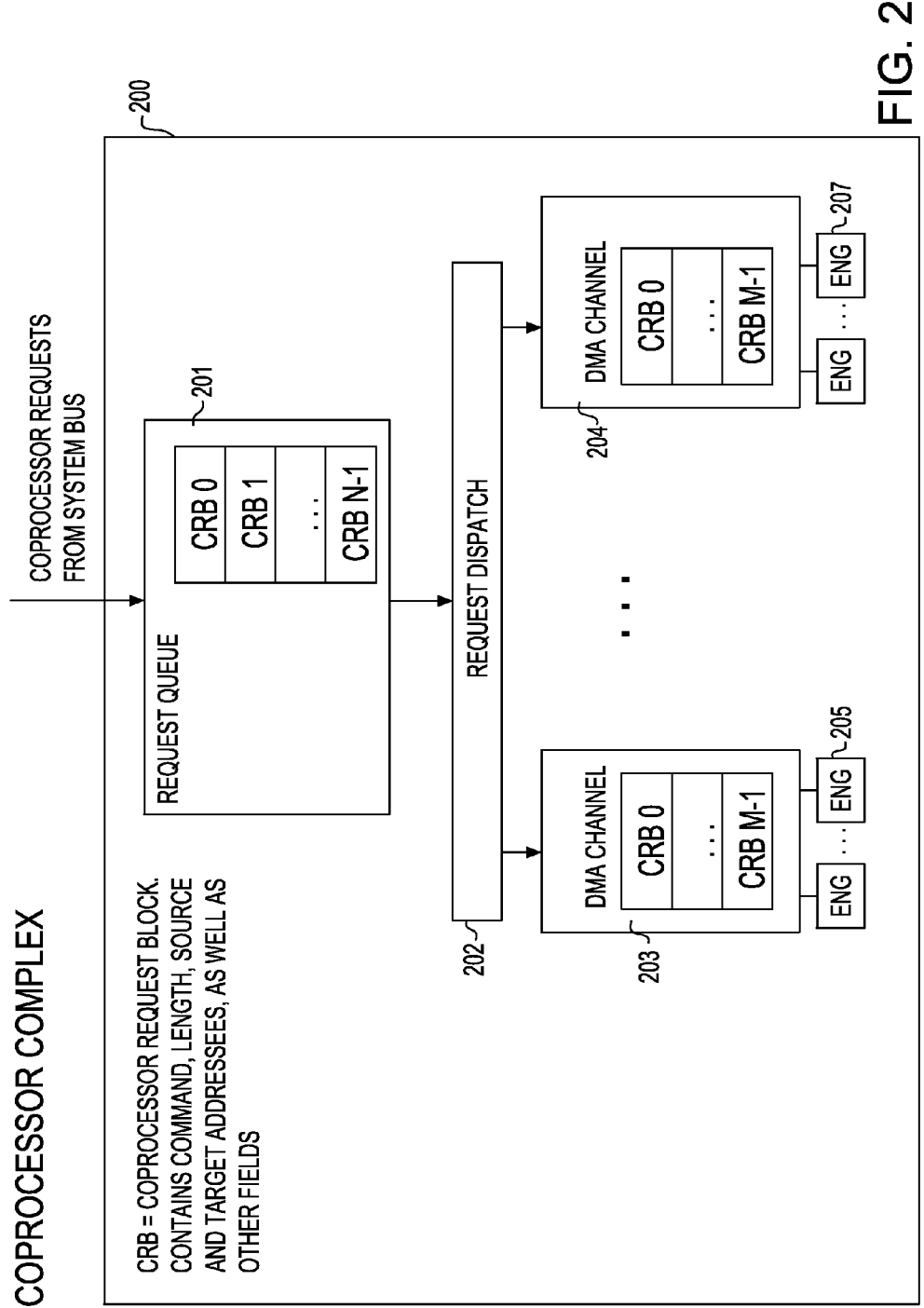
FIG. 2 is a schematic block diagram of a representative view of a coprocessor complex with 0 to L−1 coprocessors and associated hardware acceleration engines with corresponding processing queues 0 to M−1 receiving coprocessor requests from request queues 0 to N−1.

Referring to FIG. 2, a block diagram of coprocessor request queuing and dispatch elements in the coprocessor complex 200 is shown. Request queue 201 maintains N local read buffers to hold pending coprocessor request blocks (CRB) 0 to N−1. Each CRB holds information required to execute a hardware acceleration coprocessor job, including commands, and the addresses and lengths of source and target memory buffers holding required data and other fields. Additional fields in the CRB include the Logical Partition ID (LPID), Interrupt Source Number (ISN), and Synchronous Job Tag (SJT). The LPID identifies the virtual partition that created the coprocessor request. The ISN is used to route an interrupt to the processor resource that will handle it. The SJT is a tag uniquely identifying a single coprocessor request. Multiple coprocessor requests may have the same value for LPID and/or ISN.

Request dispatch element 202 monitors usage and capacity of the DMA channels 203, 204 and receives CRBs from the request queue 201 and routes to the appropriate DMA channel 203, 204 when a coprocessor is able to accept a job. DMA channels 203, 204 maintain m local CRB buffers to hold coprocessor request blocks transmitted from the request dispatch element 202 to individual channels 203, 204. The requests are then routed to the one or more hardware accelerator engines 205, 207 attached to the channels 0 to L−1 203, 204.

Figure 3:
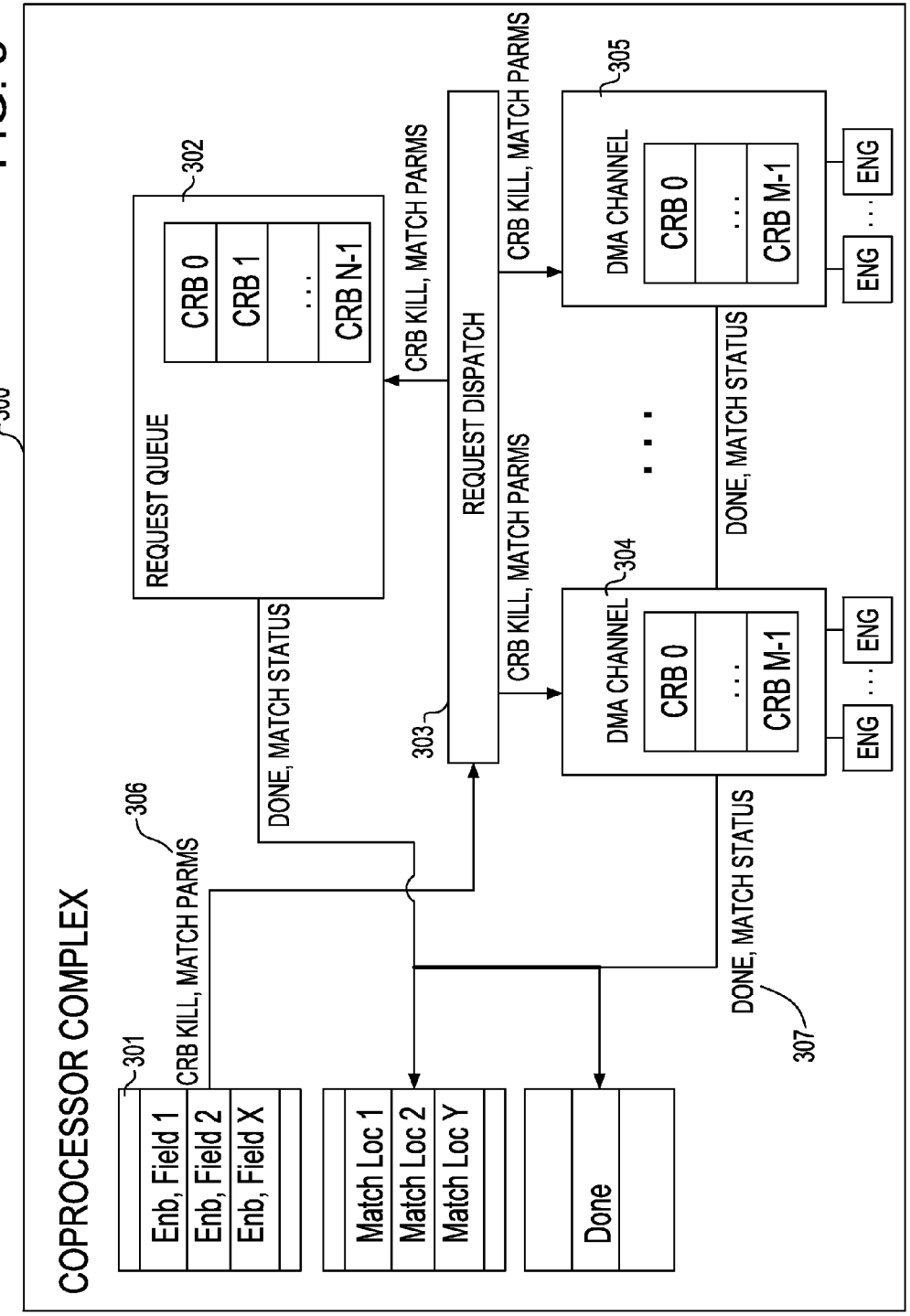
FIG. 3 is a schematic block diagram and signal flow illustrating a coprocessor request block termination process according to embodiments.

With reference to FIG. 3, the signal flow for the CRB kill command in the coprocessor complex 300 is shown. The CRB kill register 301 resides within coprocessor complex 300, however, persons of skill in the art will appreciate other configurations may be implemented without departing from the scope and substance of the embodiments. The CRB kill register 301 provides fields for enable and match as well as done status bits, one for each CRB in the coprocessor complex. A job termination request is initiated by the assertion of the CRB KILL, MATCH PARMS signals 306. Match parameters may include LPID, ISN and SJT elements described above. CRB KILL, MATCH PARMS signals 306 are sent from CRB Kill register 301 to the request dispatch element 303. Request dispatch element 303 forwards to the request queue 302 and DMA channel 0 to L−1 304, 305 to determine whether a currently buffered or dispatched coprocessor job has been selected for termination.

The enable field represents one specific bit range among multiple bit fields in the CRB kill register. If there is a CRB match in either request queue 302 or in one of DMA channels 0 to L−1 304, 305 a "done" and "match status" 307 signal is transmitted back to CRB Kill register 301 and the terminated CRB is flushed from local buffers of the DMA channels 0 to L−1 304, 305 and/or request queue 302.

Figure 4:
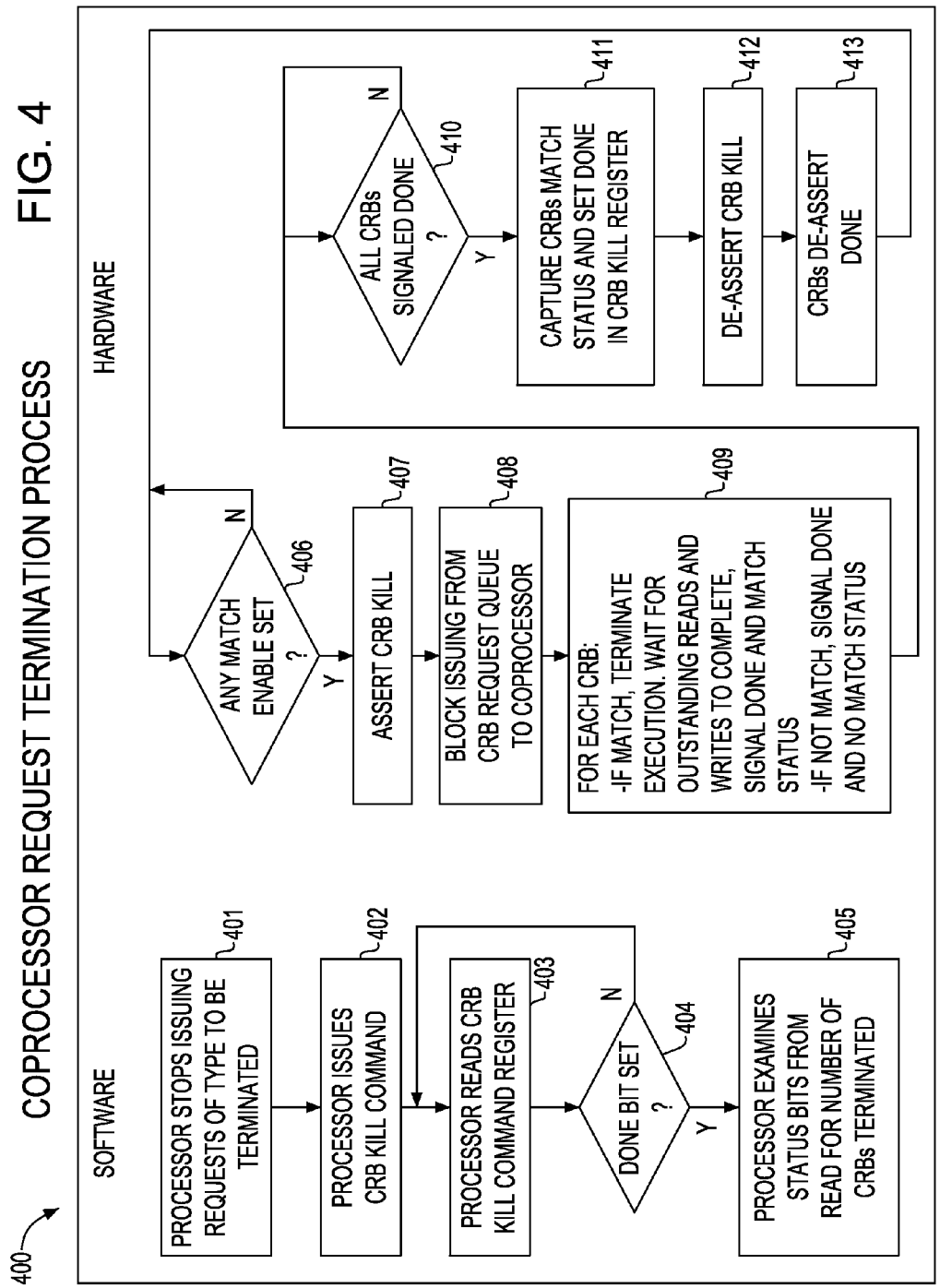
FIG. 4 is a representative flow of steps taken in software and hardware to implement a coprocessor request termination process according to embodiments.

Referring to FIG. 4, an abbreviated flow in software and hardware for the coprocessor request termination process is shown. With reference to the software flow, the hypervisor or other virtual machine manager (VMM) stops issuing coprocessor requests for the specified type of coprocessor function 401. After that, the hypervisor or other virtual machine manager (VMM) issues a kill command 402 with respect to either a specific CRB or a type of CRB. The hypervisor must stop issuing CRBs of the type to be terminated before the CRB Kill is initiated so that all CRBs potentially subject to termination have propagated to the coprocessor complex (either in the Request Queue, Bridge Controller or Coprocessors) when the CRB kill command is executed. Otherwise, some of the CRB requests of the type to be terminated may not be flagged.

The requesting processor monitors the kill command register 403 to detect when the "done" bit is set 404 in the CRB Kill register. Once the "done" bit is asserted, the requesting processor reads status bits associated with the CRB kill request to track the number of CRBs that were terminated.

With reference to the hardware flow of FIG. 4, in step 406 the coprocessor complex 300 continuously polls whether a CRB match enable is set in the CRB kill register 301 and asserts CRB KILL, MATCH PARMS signal (306) in step 407 once asserted. In step 408, Request Dispatch logic 303 then blocks the issuance of any CRB request waiting in CRB request queue 302 to the channels 304, 305. Once the Request Dispatch interface is quiesced, meaning no new requests arrive from request queue 302, it forwards the CRB KILL, MATCH PARMS signal 306 to Request Queue 302 in the Bridge and the CRB queues in DMA channels 304, 305.

In the Bridge Request Queue 302, Coprocessor requests that are in the queue are marked for checking, even if the CRB data for the request is not in the queue yet. They will be checked when the CRB data is present in the queue. Any CRBs that match are removed from the request queue 302 and match status is indicated to the CRB Kill register. Any enqueued CRBs not matching have "no-match" status indicated to the CRB Kill register.

In DMA channels 304, 305 upon assertion of the CRB Kill signal, CRB requests are prevented from moving into the next stage of processing. A DMA channel that is prefetching source data on behalf of a CRB that is queued but not active with an engine is prevented from becoming the active CRB with that engine. Once the CRB match is detected, the DMA channels 304, 305 stop fetching input (source) data for that CRB, and wait for outstanding memory read and write operations associated with the CRB selected for termination to complete in step 409. Any output (target) data queued to be sent is allowed to be written to the system bus. If accelerator engine execution has already completed and the coprocessor is reporting completion status, it is allowed to complete and the CRB is not reported as "killed" in the CRB Kill register. If the CRB still has an active accelerator engine associated with it, a terminate signal is sent to the accelerator engine to return it to an idle state. If completion status reporting has not started yet, the completion status write is blocked and the CRB is reported as "killed" in the CRB Kill register. If no CRB match is detected, coprocessor complex 300 asserts a done signal 307 and indicates "no match" status in the CRB kill register. When all CRB kill requests are signaled as "done," in step 411 the match status is captured and the "done" bit is set in the CRB kill register 301. Once all associated CRB requests are terminated, the CRB KILL, MATCH PARMS signals 306 are deasserted in step 412 then buffers holding CRBs de-assert the done signal 307 in step 413.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It should further be understood that the terminology used herein is for the purpose of describing the disclosed embodiments only and is not intended to be limiting. As used herein, the singular forms "a", "an" and "the" are intended to include the plural forms as well, unless the context clearly indicates otherwise. It should further be understood that the terms "comprises" "comprising", "includes" and/or "including", as used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The description above has been presented for purposes of illustration and description, but is not intended to be exhaustive or limited to the embodiments in the form disclosed. Many modifications and variations to the disclosed embodiments will be apparent to those of ordinary skill in the art without departing from the scope and spirit of the disclosed embodiments.

What is claimed is:

1. A method of terminating a processing job assigned to a coprocessor hardware accelerator in a distributed computer system having multiple processing elements and memory resources communicating through a bus, comprising:
   defining a coprocessor request block (CRB) queue to hold each one of a plurality of coprocessor requests initiated by a software control element;
   providing a single dedicated coprocessor request kill register to initiate a termination request, monitor completion status of a pending termination request and store parameter data for a coprocessor request selected for termination;
   in response to a termination request being initiated:
      broadcasting a signal to each one of a plurality of processing queues of the coprocessor hardware accelerator in the distributed computer system to block pending job requests in each one of the plurality of processing queues from advancing to a next stage of processing;
      identifying, and storing in the single dedicated coprocessor request kill register, the coprocessor request selected for termination in the coprocessor request block (CRB) queue, in the plurality of processing queues of the coprocessor hardware accelerator, and in an active hardware accelerator;
      removing the coprocessor request selected for termination from the coprocessor request block (CRB) queue, from the plurality of processing queues of the coprocessor hardware accelerator, and from the active hardware accelerator, the removed coprocessor request selected for termination having parameter data matching the parameter data of the single dedicated coprocessor request kill register; and
      updating completion status in the single dedicated coprocessor request kill register.

2. The method according to claim 1, wherein the plurality of processing queues of the coprocessor hardware accelerator comprises a first queue to receive all processing job requests in the distributed computer system and a second queue to receive job requests associated with the coprocessor hardware accelerator.

3. The method according to claim 2, wherein the second queue comprises a plurality of queues, each one corresponding to a specific coprocessor hardware accelerator type.

4. The method according to claim 1, wherein the CRB comprises one or more data fields representing instructions sent to a coprocessor hardware accelerator and a length of source and target addresses associated with the instruction.

5. The method according to claim 1, wherein the software control element comprises a hypervisor software control element.

6. The method according to claim 1, further comprising:
terminating an outstanding coprocessor request at any point up until completion of the coprocessor request.

7. The method according to claim 2, further comprising:
identifying a location in hardware of the coprocessor request job selected for termination.

8. The method according to claim 7, wherein the location in hardware comprises a position in one of a plurality of bridge request queue entries of the first queue.

9. The method according to claim 7, wherein the location in hardware comprises a position in one of a plurality of coprocessor request blocks of the second queue currently being processed.

10. The method according to claim 9, wherein one of the plurality of coprocessor request blocks comprises one for which data is being prefetched.

11. The method according to claim 9, wherein one of the plurality of coprocessor request blocks for which a coprocessor hardware accelerator is executing the processing job selected for termination.

12. The method according to claim 1, further comprising:
waiting for an outstanding read or write operation associated with the coprocessor request selected for termination to complete prior to updating status and terminating the request.

13. The method according to claim 4, further comprising:
marking a first coprocessor request block (CRB) to be checked for a CRB Kill match before all of the data for the first CRB has transferred from the system bus.

* * * * *